United States Patent
Choi et al.

(10) Patent No.: US 8,486,571 B2
(45) Date of Patent: Jul. 16, 2013

(54) METHOD FOR CONTROLLING OUTPUT OF FUEL CELL IN FUEL CELL HYBRID VEHICLE

(75) Inventors: Seo Ho Choi, Seoul (KR); Nam Woo Lee, Gyeonggi-do (KR); Soon Il Jeon, Gyeonggi-do (KR); Sang Uk Kwon, Gyeonggi-do (KR); Seong Pil Ryu, Gyeonggi-do (KR); Sun Soon Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1155 days.

(21) Appl. No.: 12/334,747

(22) Filed: Dec. 15, 2008

(65) Prior Publication Data

US 2009/0325004 A1   Dec. 31, 2009

(30) Foreign Application Priority Data

Jun. 27, 2008 (KR) ................. 10-2008-0061277
Jul. 8, 2008 (KR) ................. 10-2008-0065804

(51) Int. Cl.
*H01M 8/06* (2006.01)
(52) U.S. Cl.
USPC .......... 429/427; 429/428; 429/429; 429/430; 429/431; 429/432; 429/433; 429/449
(58) Field of Classification Search
USPC ......................... 429/427–433, 449
See application file for complete search history.

(56) References Cited

U.S. PATENT DOCUMENTS

2006/0102397 A1\* 5/2006 Buck et al. .................. 180/65.3
2007/0285048 A1\* 12/2007 Leach et al. .................. 320/101

FOREIGN PATENT DOCUMENTS

| JP | 10-075504 | 3/1998 |
| KR | 10-0213761 | 5/1999 |
| KR | 10-2002-0059740 | 7/2002 |
| KR | 10-2003-0091183 | 12/2003 |
| KR | 10-2004-0001776 | 1/2004 |

\* cited by examiner

*Primary Examiner* — Patrick Ryan
*Assistant Examiner* — Ben Lewis
(74) *Attorney, Agent, or Firm* — Edwards Wildman Palmer LLP; Peter F. Corless

(57) ABSTRACT

The present invention provides a method for controlling output of a fuel cell to improve fuel efficiency of a fuel cell hybrid vehicle, in which the fuel cell is operated at a constant power at a maximum efficiency point, wherein the fuel cell and a storage means are directly connected if the output and energy of the storage means is insufficient, and the power generation of the fuel cell is stopped when the level of energy of the storage means is increased during stopping or during low power operation such that the fuel cell is intensively operated at the maximum efficiency point, thus improving the fuel efficiency of the fuel cell and the efficiency of the fuel cell system.

15 Claims, 13 Drawing Sheets

METHOD FOR CONTROLLING OUTPUT OF FUEL CELL IN FUEL CELL HYBRID VEHICLE

CROSS-REFERENCE TO RELATED APPLICATION

This application claims under 35 U.S.C. §119(a) the benefit of Korean Patent Application Nos. 10-2008-0061277 filed on Jun. 27, 2008 and 10-2008-0065804 filed on Jul. 8, 2008, the entire contents of which are incorporated herein by reference.

BACKGROUND (a) Technical Field

The present invention relates to a method for controlling output of a fuel cell to improve fuel efficiency of a fuel cell hybrid vehicle. More particularly, the present invention relates to a method for controlling output of a fuel cell in a fuel cell hybrid vehicle that preferably includes a fuel cell as a main power source and a storage means (preferably a supercapacitor or battery) as an auxiliary power source, which can improve the fuel efficiency and the efficiency of a fuel cell system by effectively controlling the output of the fuel cell according to the level of energy stored in the storage means.

(b) Background Art

In general, a fuel cell is an electricity generation system that does not convert chemical energy of fuel into heat by combustion, but electrochemically converts the chemical energy directly into electrical energy in a fuel cell stack. Such a fuel cell can be suitably applied to the supply of electric power for small-sized electrical/electronic devices such as portable devices, as well as to the supply of electric power for industry, home, and vehicle.

At present, the most attractive fuel cell generally in use for a vehicle is a polymer electrolyte membrane fuel cell (PEMFC), also called a proton exchange membrane fuel cell, comprising: a membrane electrode assembly (MEA) including a polymer electrolyte membrane (PEM) for transporting hydrogen ions and an electrode catalyst layer, in which an electrochemical reaction takes place, suitably disposed on both sides of the PEM; a gas diffusion layer (GDL) for uniformly diffusing reactant gases and transmitting generated electricity; a gasket and a sealing member for maintaining airtightness of the reactant gases and coolant and providing an appropriate bonding pressure; and a bipolar plate for transferring the reactant gases and coolant.

In the fuel cell having the above-described configuration, hydrogen as a fuel and oxygen (air) as an oxidizing agent are preferably supplied to an anode and a cathode through flow fields of the bipolar plate, respectively. The hydrogen is suitably supplied to the anode (also called a "fuel electrode", "hydrogen electrode", and "oxidation electrode") and the oxygen (air) is suitably supplied to the cathode (also called an "air electrode", "oxygen electrode", and "reduction electrode"). The hydrogen supplied to the anode is dissociated into hydrogen ions (protons, $H^+$) and electrons ($e^-$) by catalyst of the electrode catalyst layer preferably provided on both sides of the electrolyte membrane. Preferably, only the hydrogen ions are selectively transmitted to the cathode through the electrolyte membrane, which is a cation exchange membrane and, at the same time, the electrons are suitably transmitted to the anode through the GDL and the bipolar plate, which are conductors. At the anode, the hydrogen ions supplied through the electrolyte membrane and the electrons transmitted through the bipolar plate meet the oxygen in the air preferably supplied to the anode by an air supplier and suitably cause a reaction that produces water. Due to the movement of hydrogen ions occurring at this time, the flow of electrons through an external conducting wire occurs, and thus a current is generated.

If the fuel cell is used as the only suitable power source of an electric vehicle, the fuel cell powers all loads of the vehicle, which results in performance deterioration during operation, where the efficiency of the fuel cell is low. Moreover, during high speed operation where a high voltage is suitably required, a sufficient voltage required by a drive motor is not supplied due to a rapid decrease in output voltage, and thus decreases acceleration performance. Furthermore, if a sudden load is applied to the vehicle, the output voltage of the fuel cell drops or suddenly drops and suitably sufficient power is not supplied to the drive motor, thus decreasing vehicle performance (for example, a sudden change in load imposes a heavy burden on the fuel cell since electricity is generated by an electrochemical reaction). In addition, since the fuel cell has unidirectional output characteristics, it is difficult to recover energy from the drive motor during braking of the vehicle, thus decreasing the efficiency of the vehicle system.

Accordingly, a fuel cell hybrid vehicle has been developed. Preferably, a fuel cell hybrid vehicle includes a large vehicle, such as, but not limited to, a bus, as well as a small vehicle, and is equipped with a suitable storage means such as a high voltage battery or a supercapacitor as an auxiliary power source for providing suitable power required for driving the motor in addition to the fuel cell as a main power source. At present, a fuel cell-storage means hybrid vehicle that does not employ a power converter has been studied, and the fuel cell-storage means hybrid vehicle has, for example, high fuel efficiency (high regenerative braking, high efficiency of supercapacitor, and without the use of the power converter), an increase in durability of the fuel cell, high reliability control, and the like.

In examples where the hybrid vehicle in which the fuel cell and the storage means are directly connected, the fuel cell continuously outputs power at suitably constant level during driving. Preferably, if electric power is suitably sufficient, the storage means is charged with surplus power, whereas, if the electric power is insufficient, the storage means supplies the insufficient power to drive the vehicle.

Preferably, a fuel cell-supercapacitor hybrid vehicle in which a supercapacitor is employed as the storage means preferably includes a fuel cell suitably used as a main power source, a supercapacitor suitably used as an auxiliary power source, a supercapacitor precharge unit suitably interposed between a main bus terminal, which is an output port of the fuel cell, and the supercapacitor, and a motor control unit (MCU) (preferably with an inverter), which is a power module for rotating a drive motor, preferably connected to output ports of the fuel cell and the supercapacitor, producing a 3-phase pulse width modulation (PWM) by receiving direct current therefrom, and controlling the motor drive and the regenerative braking. Preferably, the supercapacitor precharge unit is used only to charge the discharged supercapacitor during initial start-up.

Accordingly, the above-described fuel cell-supercapacitor hybrid vehicle preferably uses the fuel cell as the main power source, which receives hydrogen from a hydrogen tank and air from an air blower to generate electricity by an electrochemical reaction between hydrogen and oxygen in the air. According to preferred embodiments of the invention, the drive motor and the MCU are directly connected to the fuel cell through the main bus terminal, and the supercapacitor is connected to the fuel cell through the supercapacitor precharge unit to provide power assist and regenerative braking.

The configuration of an exemplary fuel cell system will be briefly described herein. FIG. 1 shows an exemplary air supplier and a hydrogen supplier. As shown in the figure, dry air suitably supplied through an air blower 28 is humidified by a humidifier 29 and supplied to a cathode of a fuel cell stack 2. Preferably, exhaust gas of the cathode, humidified with water generated from the cathode, is delivered to the humidifier 29 and used to humidify dry air to be supplied to the cathode by the air blower 28.

Preferably, the hydrogen supplier comprises two lines. The first line supplies hydrogen to an anode of the fuel cell stack 2 through a low pressure regulator (LPR) 23, and a portion of hydrogen at an outlet port of the anode is recirculated through a recirculation blower 24. The second line supplies hydrogen at high pressure directly to the anode through a valve 25 and an ejector 26, and a portion of hydrogen at the outlet port of the anode is recirculated and supplied through the ejector 26.

Moreover, hydrogen remaining in the anode directly passes through an electrolyte membrane without generation of electricity and reacts with oxygen in the cathode, which is called "crossover". In order to reduce the amount of hydrogen crossover, it is necessary to reduce the anode pressure during low power operation and increase the anode pressure during high power operation wherein the output of the fuel cell stack is increased. To this end, the low pressure regulator 23 is used singly when low pressure is required, and hydrogen at high pressure is supplied by controlling the valve 25 when high power is required or during hydrogen purging. The higher the anode (hydrogen) pressure is, the more the amount of hydrogen crossover is increased. Since the hydrogen crossover has undesirable effects on the fuel efficiency and durability of the fuel cell, it is necessary to maintain an appropriate anode pressure. Accordingly, a hydrogen purge valve 27 is preferably used to discharge impurities and condensed water at the anode, thus ensuring the performance of the fuel cell stack. The outlet port of the anode is suitably connected to a water trap 31 such that the condensed water stored in the water trap 31 is discharged through a valve 32 if the amount of condensed water reaches a suitable predetermined level.

Preferably, the driving mode of the hybrid vehicle including the fuel cell as the main power source and the supercapacitor (or a high voltage battery which is a secondary battery) as the auxiliary power source includes an electric vehicle (EV) mode in which the motor is driven only by the power of the fuel cell, a hybrid electric vehicle (HEV) mode in which the motor is driven by the fuel cell and the supercapacitor at the same time, and a regenerative braking (RB) mode in which the supercapacitor is charged.

However, in the fuel cell-supercapacitor hybrid vehicle the supercapacitor is automatically charged by the fuel cell, which restricts the regenerative braking. Accordingly, such a problem can be solved by stopping the operation of the fuel cell during low power operation and during regenerative braking. Moreover, it is possible to improve the fuel efficiency by restricting the use of the fuel cell during low power operation where the efficiency of the fuel cell is low.

As above, in order to improve the fuel efficiency, it is necessary to consider the fuel cell stop/restart process, i.e., an idle stop/start control process, in which the power generation of the fuel cell is suitably stopped and restarted (the fuel cell is turned on and off), if necessary, during driving of the fuel cell-battery or fuel cell-supercapacitor hybrid vehicle. The idle stop of the fuel cell during driving of the vehicle is clearly distinguished from the shut-down of the fuel cell system after the vehicle operation is finished. Accordingly, it is necessary to distinguish a control process for the idle stop of the fuel cell from a control process for the shut-down of the fuel cell system.

In order to improve the fuel efficiency of the hybrid vehicle including the fuel cell and the storage means, U.S. Patent Publication No. 20030118876 is directed to a method in which a relay switch, connected between a fuel cell and a supercapacitor, is turned off to disconnect the output of the fuel cell during low power operation or if the voltage of the supercapacitor is above a predetermined level, and the relay switch is turned on to connect the output of the fuel cell if an output required by the vehicle is increased or if the voltage of the supercapacitor is below a predetermined level. In this technique, the relay switch of a main bus terminal for disconnecting the output of the fuel cell is turned on and off to achieve the idle stop/start, and thus a separate relay on/off control is required. The above technique does not perform any control other than connecting and disconnecting the output of the fuel cell by turning on and off the relay switch. Furthermore, the relay switch is turned off during regenerative braking and is turned on, if the voltage is above a predetermined level, in a state where the power generation of the fuel cell is made. Accordingly, a portion of the amount of regenerative braking is consumed in fuel cell balance-of-plant (BOP) components to be used in the power generation of the fuel cell, which is to prevent the voltage of the main bus terminal from rising.

U.S. Pat. No. 6,484,075 is directed to a technique in which the fuel cell power supply is cut off by determining an idle state based on a wheel rotational speed, whether or not a brake is operated, a state of charge (SOC), an electrical load, and the like, and the fuel cell power supply is restarted if a power storage unit is below a predetermined SOC. Here, the conditions for entering the idle stop are considerably restrictive (e.g., the idle stop is performed if the vehicle stopped, if the load is below a predetermined value, if the brake is in an operation state, and if the SOC is above a predetermined value). Moreover, a separate device such as a DC/DC chopper is required at the fuel cell for the idle stop, and the DC/DC chopper is directly connected to the supercapacitor during releasing the idle stop state after the DC/DC chopper is used to limit the current. The DC/DC chopper is a buck converter, which is restrictively used to limit the current when it is directly connected to the supercapacitor after cutting off the fuel cell current.

It is necessary to provide a method for suitably improving the fuel efficiency of the fuel cell system by effectively controlling the fuel cell by a more simplified control technique, for example as distinguished from conventional techniques.

Accordingly, to the present invention preferably provides a method for maximizing energy recovery during regenerative braking, wherein the method comprises a more simplified control technique, and is a method for effectively stopping the operation of the fuel cell therefor.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a method for suitably controlling the output of a fuel cell in a fuel cell hybrid vehicle including a fuel cell as a main power source and a storage means (preferably a supercapacitor or a battery) as an auxiliary power source, which can improve fuel efficiency and the efficiency of a fuel cell system by effectively controlling the output of the fuel cell according to the level of energy stored in the storage means.

In preferred embodiments, the present invention provides a method for suitably controlling output of a fuel cell in a fuel cell-storage means hybrid vehicle, which can maximize the amount of energy recovery during regenerative braking and thus improve the fuel efficiency.

In one embodiment, the present invention provides a method for controlling output of a fuel cell in a fuel cell hybrid vehicle preferably including a fuel cell as a suitable main power source and a storage means as a suitable auxiliary power source, the vehicle preferably comprising a power converter disposed between the fuel cell and the storage means and provided for a constant current operation of the fuel cell and, preferably, a directly connected switch for directly connecting/disconnecting between the fuel cell and the storage means, the method comprising controlling the output of the fuel cell according to the amount of electrical energy of the storage means, preferably by a mode selected from the group consisting of a fuel cell stop mode in which power generation of the fuel cell is suitably stopped, a fuel cell constant current mode in which the power converter is operated so that the fuel cell is operated at a constant power at a maximum efficiency point, and a fuel cell-storage means direct connection mode in which the fuel cell and the storage means are suitably directly connected by the directly connected switch and then the output of the fuel cell is controlled according to a load required by the vehicle.

In a preferred embodiment, if the amount of electrical energy of the storage means is below a suitable reference value for restarting the power generation of the fuel cell and if the elapsed time after the fuel cell stop suitably exceeds a predetermined minimum retention time in the fuel cell stop mode, the fuel cell stop mode is preferably switched to the fuel cell constant current mode in a state where the directly connected switch is turned off.

In another preferred embodiment, in the fuel cell constant current mode, fuel cell balance-of-plant components are preferably controlled to be operated at a suitably constant power in a state where the power converter is preferably controlled to apply a voltage corresponding to the maximum efficiency point to an output side of the fuel cell such that the fuel cell is operated at a constant power in which an output current of the fuel cell is maintained at a suitably constant level.

In still another preferred embodiment, the power converter is preferably a buck-boost converter, and a converter controller controls the operation of the buck-boost converter to apply a voltage corresponding to the maximum efficiency point by sensing a voltage of an output terminal of the buck-boost converter, preferably through a voltage sensor.

In yet another preferred embodiment, if the amount of electrical energy of the storage means is suitably below a reference value for starting the fuel cell-storage means direct connection mode in the fuel cell constant current mode, the fuel cell and the storage means are preferably directly connected by the directly connected switch and the operation of the power converter is suitably stopped such that the fuel cell constant current mode is switched to the fuel cell-storage means direct connection mode.

In still yet another preferred embodiment, air is supercharged to a fuel cell stack for a predetermined period of time before the fuel cell and the storage means are suitably directly connected by the directly connected switch.

In a further preferred embodiment, the amount of electrical energy of the storage means is a storage means voltage preferably measured by a voltage sensor of a main bus terminal.

In another further preferred embodiment, the method for controlling output of a fuel cell in a fuel cell hybrid vehicle preferably comprises: determining whether regenerative braking is performed; determining whether to enter the fuel cell stop mode by comparing the amount of electrical energy of the storage means with reference values suitably predetermined according to whether the regenerative braking is performed; and stopping the power generation of the fuel cell if the amount of electrical energy of the storage means is greater than the corresponding reference value.

In still another further preferred embodiment, the reference value during regenerative braking is set to be suitably lower than the reference value in the case where the regenerative braking is not performed so that the fuel cell stop mode is preferably performed in a state where the amount of electrical energy of the storage means is suitably lower than that in the case where the regenerative braking is not performed.

In yet another further preferred embodiment, the method for controlling output of a fuel cell in a fuel cell hybrid vehicle further comprises: switching the fuel cell-storage means direct connection mode to the fuel cell constant current mode, if the amount of electrical energy of the storage means is above a suitably predetermined level in the fuel cell-storage means direct connection mode in a state where the directly connected switch is turned on; determining whether the regenerative braking is performed in the fuel cell constant current mode; determining whether to enter the fuel cell stop mode; and stopping the power generation of the fuel cell.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
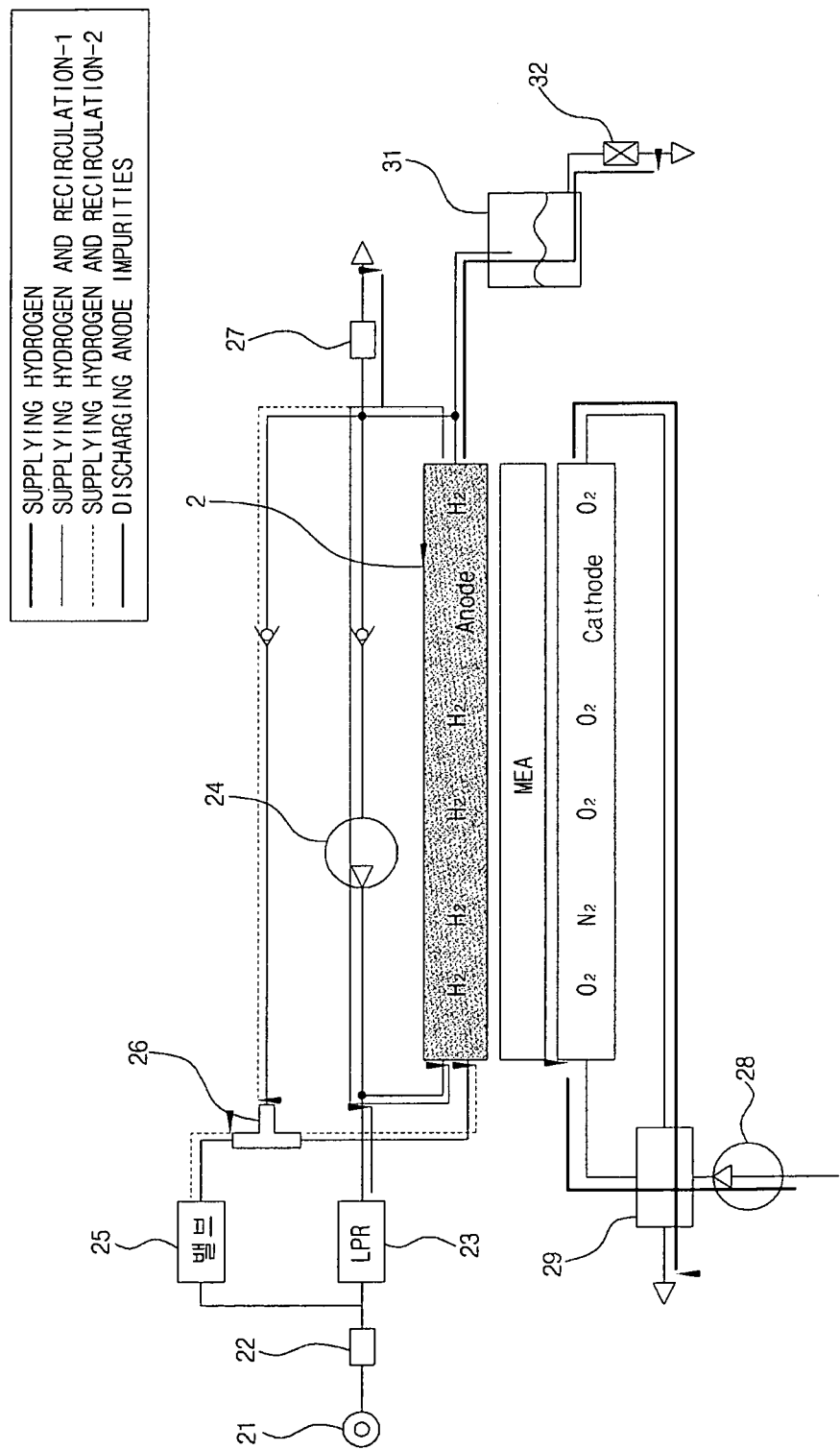
FIG. 1 is a diagram showing an exemplary configuration of a fuel cell system.

Reference numerals set forth in the Drawings includes reference to the following elements as further discussed below:

| | |
|---|---|
| 110: fuel cell system | 111: fuel cell system controller |
| 120: power conversion unit | 121: buck-boost converter |
| 122: converter controller | 123: power distribution controller |
| 125: directly connected switch | 131: supercapacitor (storage means) |
| 141: inverter | 142: drive motor |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In one aspect, the invention features a method for controlling output of a fuel cell in a fuel cell hybrid vehicle including a fuel cell as a main power source and a storage means as an auxiliary power source, the method comprising controlling the output of the fuel cell according to the amount of electrical energy of the storage means by a mode selected from the group consisting of a fuel cell stop mode, a fuel cell constant current mode, and a fuel cell-storage means direct connection mode and then the output of the fuel cell is controlled.

In one embodiment of the method, the vehicle comprises a power converter disposed between the fuel cell and the storage means and provides for a constant current operation of the fuel cell and a directly connected switch for directly connecting/disconnecting between the fuel cell and the storage means. In another embodiment of the method, the fuel cell stop mode power generation of the fuel cell is stopped.

In another further embodiment, in the constant current mode the power converter is operated so that the fuel cell is operated at a constant power at a maximum efficiency point.

In still another embodiment, the fuel cell-storage means direct connection mode the fuel cell and the storage means are directly connected by a directly connected switch.

In one embodiment, the output of the fuel cell is further controlled according to a load required by the vehicle.

In a related embodiment, the amount of electrical energy of the storage means is below a reference value for restarting the power generation of the fuel cell and if the elapsed time after the fuel cell stop exceeds a predetermined minimum retention time in the fuel cell stop mode, the fuel cell stop mode is switched to the fuel cell constant current mode in a state where the directly connected switch is turned off.

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention preferably provides a method for controlling output of a fuel cell to improve fuel efficiency in a fuel cell hybrid vehicle including a fuel cell as a main power source and a storage means (supercapacitor or battery) as an auxiliary power source, which can suitably improve the fuel efficiency and the efficiency of a fuel cell system by effectively controlling the output of the fuel cell, preferably according to the level of energy stored in the storage means.

As preferably described above, although the fuel cell-storage means (e.g., supercapacitor) hybrid system that does not employ a power converter has certain advantages such as high fuel efficiency (high regenerative braking, high efficiency of supercapacitor), an increase in durability of the fuel cell, high reliability control (automatic power assist, automatic regenerative braking function), and the like, there is a limitation in the regenerative braking since the supercapacitor is automatically charged by the fuel cell. For example, when the supercapacitor, which is a storage means, is automatically charged by the fuel cell, the amount of electrical energy charged in the supercapacitor is increased, and thus the amount of electrical energy charged by the regenerative braking is reduced. Such a problem can be addressed by stopping the operation of the fuel cell during low power operation and during regenerative braking. Accordingly, it is possible to increase the amount of regenerative braking and improve the fuel efficiency by suitably stopping the power generation of the fuel cell during regenerative braking.

in preferred embodiments of the present invention, the output of the fuel cell is effectively controlled according to the level of energy stored in the storage means, which is preferably the auxiliary power source, (hereinafter, the level of energy will be a main bus terminal voltage and a supercapacitor voltage corresponding to the amount of electrical energy of the storage means), in which the fuel cell is basically operated at a constant power at a maximum efficiency point, the fuel cell and the storage means are directly connected when the output and energy of the storage means are insufficient, and the power generation of the fuel cell is stopped when the level of energy of the storage means is increased during stopping or during low power operation so that the fuel cell is intensively operated at the maximum efficiency point, thus improving the fuel efficiency of the fuel cell and the efficiency of the fuel cell system.

Accordingly, the present invention preferably provides a directly connected switch for selectively connecting/disconnecting between the power converter having a minimum capacity that satisfies the current output at a maximum efficiency point of the fuel cell, the fuel cell, and the supercapacitor, thus providing 3-step control modes preferably including a fuel cell stop (idle stop) mode, a fuel cell constant current mode, and a fuel cell-supercapacitor direct connection mode.

In order to improve the fuel efficiency in the fuel cell hybrid vehicle, it is necessary to improve the efficiency of the respective components; additionally, it is important to develop an optimal technique for driving the vehicle. Important factors for improving the fuel efficiency include, but are not limited to, a suitable reduction in the operation of fuel cell balance-of-plant (BOP) components, an increase in the amount of regenerative braking, and an increase in the use of hydrogen, which can be suitably achieved by stopping the power generation of the fuel cell during low power operation and during regenerative braking. The output of the fuel cell BOP components such as an air blower, a hydrogen recirculation blower, a water pump, etc., is greater than that required for driving the system during low power operation, and thus the efficiency of the fuel cell system is deteriorated. Accordingly, in preferred embodiments, the present invention employs a method for controlling, preferably directly controlling, the output of the fuel cell in order to avoid the use of the fuel cell during low power operation where the efficiency is low, and suitably improve the efficiency of the fuel cell system. As a result, it is possible to suitably improve the efficiency of the fuel cell system and prevent the storage means from being automatically charged during regenerative braking, which is a drawback of the fuel cell-storage means hybrid vehicle system, thus preventing a suitable reduction in the amount of regenerative braking due to an increase in the voltage of the storage means.

Described herein is the present invention taking an example of the fuel cell-supercapacitor hybrid vehicle. However, it will be readily understood by those skilled in the art that the supercapacitor may be substituted by a suitable high voltage battery, which is another auxiliary power source. It is well known in the art that the supercapacitor and the battery are suitable storage means capable of being charged and discharged and used as the auxiliary power sources of the fuel cell hybrid vehicle.

Figure 2:
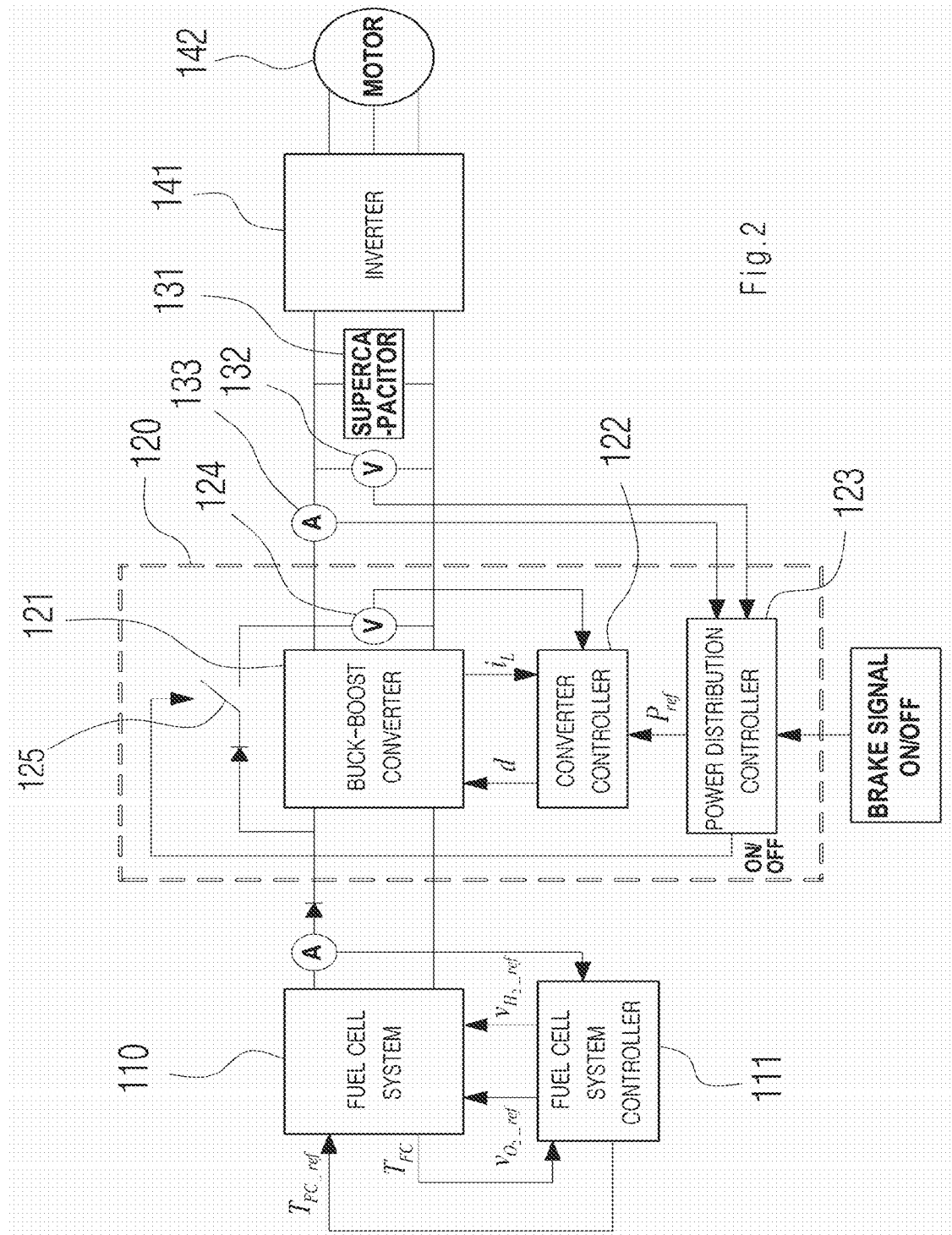
FIG. 2 is a block diagram showing an exemplary power system of a fuel cell-supercapacitor hybrid vehicle according to the present invention.

FIG. 2 is an exemplary block diagram showing a power system of a fuel cell-supercapacitor hybrid vehicle to which the present invention is preferably applied. As shown in the figure, the fuel cell-supercapacitor hybrid vehicle preferably comprises a fuel cell system 110 including a fuel cell (stack), which is a main power source, and fuel cell BOP components, a fuel cell system controller 111 for controlling the operation of the fuel cell system 110 including the BOP components, a power conversion unit 120, a supercapacitor 131, which is an auxiliary power source, and an inverter 141 for driving a motor. Moreover, in further embodiments, a voltage sensor 132 and a current sensor 133 are provided in a main bus terminal to which the supercapacitor 131 is connected.

According to other preferred embodiments, the power conversion unit 120 preferably includes a power converter 121 suitably disposed between the fuel cell 110 (of the fuel cell system in FIG. 2) and the supercapacitor 131 and serving as a load for a constant current operation of the fuel cell such that a constant current is output from the fuel cell 110, a directly connected switch 125 suitably disposed between the fuel cell 110 and the supercapacitor 131 and selectively connecting and disconnecting between the fuel cell 110 and the supercapacitor 131, a converter controller 122 for suitably sensing a voltage of an output terminal of the power converter 121 through a voltage sensor 124 and controlling the operation of the power converter 121, and a power distribution controller 123 as a superior controller for selecting the operation mode of the fuel cell 110 and controlling the operation of the converter controller 122 and the directly connected switch 125. Preferably, in the present invention, the selection and control of the operation mode of the fuel cell 110 are executed by cooperative control between the power distribution controller 123, the fuel cell system controller 111, and the converter controller 122.

According to embodiments of the invention described herein, the power converter 121 is a device which preferably serves as a load so that a constant current is output from the fuel cell 110 during operation and is connected to the main bus terminal to be suitably positioned between the fuel cell 110 and the supercapacitor 131.

In embodiments of the present invention, the power converter 121 may preferably be a buck-boost converter capable of decreasing and increasing the input voltage under the control of the converter controller 122. The buck-boost converter 121 suitably maintains the voltage of the output terminal of the power converter 121 at a constant level under the control of the converter controller 122 so that the voltage applied to the output side of the fuel cell 110 is maintained at a constant level, thus fixing the output current of the fuel cell 110 to a certain value i.e., allowing the constant current operation of the fuel cell 110.

As is generally known in the art, in the fuel cell system 110, the operation of the system components such as the fuel cell BOP components are suitably controlled so as to output a current corresponding to the amount of load applied to the output side of the fuel cell stack. That is, the fuel cell system 110 is controlled to output a current corresponding to the amount of current drawn by the load at the output side of the fuel cell system 110.

Accordingly, in further embodiments, if the amount of load of the output side of the fuel cell system 110 is set to a certain level by the operation of the buck-boost converter 121, the system components such as the fuel cell BOP components are preferably operated in the constant current mode so as to output a constant current corresponding to the level. As a result, if the amount of load is fixed by controlling the operation of the buck-boost converter 121, the output current value of the fuel cell 110 is fixed to a desired operation point, thus achieving a suitable constant power operation.

In further preferred embodiments, during the constant current mode of the fuel cell 110, a one-point operation at a maximum efficiency point of the fuel cell 110, i.e., the constant current operation is preferably performed by the operation of the buck-boost converter 121 so that a constant current value at a maximum efficiency point is suitably output from the fuel cell regardless of a change in the voltage of the supercapacitor 131.

Figure 3:
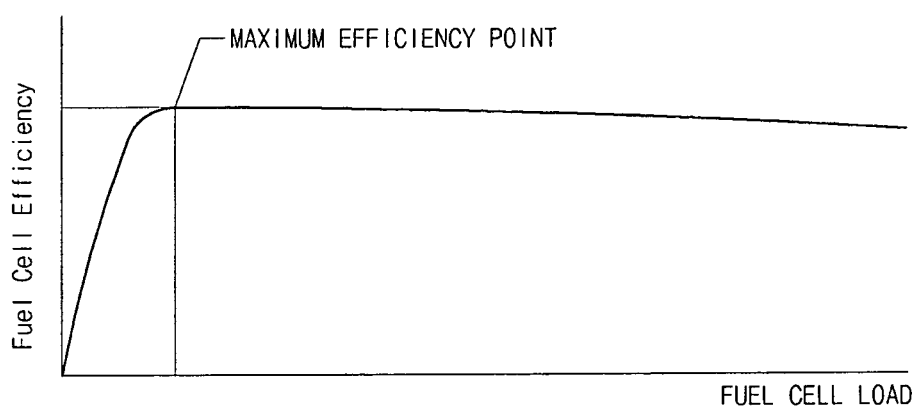
FIG. 3 is a diagram showing a maximum efficiency point of the fuel cell system.

Accordingly, the fuel cell is operated in the constant current mode at a maximum efficiency, in which the buck-boost converter 121 is controlled to apply a voltage corresponding to the maximum efficiency point to the output side of the fuel cell, thus maintaining the output current of the fuel cell at a constant level. For example, as shown in FIG. 3, if a value corresponding to the load of the fuel cell showing the maximum efficiency is, for example, between 8-12 A (ampere), preferably 10 A (ampere), the buck-boost converter 121 (operating as a load) is suitably driven so that the current of 10 A is output from the fuel cell, thus fixing the output of the fuel cell to 10 A. For the constant current operation of the fuel cell, with the operation of the buck-boost converter 121 which fixes the amount of load, the fuel cell BOP components are preferably controlled to be operated at a constant power by the fuel cell system controller 111 so that the output of the fuel cell is maintained constant.

In other further embodiments, the buck-boost converter 121 may have a suitable minimum capacity that satisfies the current output at a maximum efficiency point of the fuel cell. Since the fuel cell 110 and the supercapacitor 131 are suitably directly connected, preferably using the directly connected switch 125, if necessary, it is possible to employ a buck-boost converter having a capacity lower than that of existing converters.

In the exemplary power system configuration of FIG. 2, the directly connected switch 125 may be, but is not limited to, a relay or an IGBT device. In certain embodiments, since the fuel cell 110 and the supercapacitor 131 are selectively connected or disconnected by the directly connected switch 125, the degree of freedom of the fuel cell output control is suitably increased, compared with existing fuel cell-supercapacitor systems, thus improving the fuel efficiency and providing an advantageous structure in terms of the protection of the fuel cell.

Figure 4:
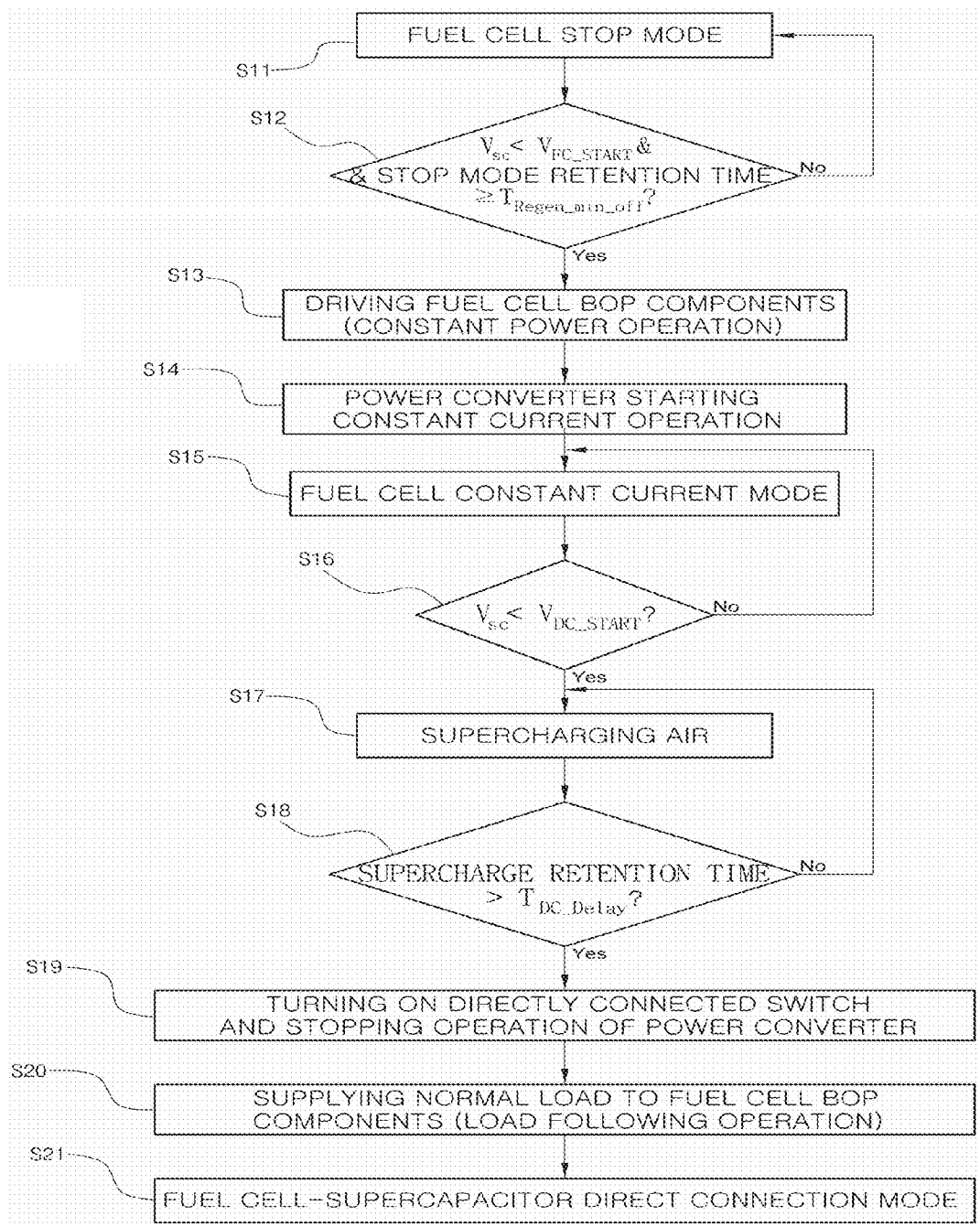
FIG. 4 is a flowchart showing a method for controlling output of a fuel cell in accordance with a preferred embodiment of the present invention, in which a mode switching process of the fuel cell during vehicle acceleration is shown.
Figure 5:
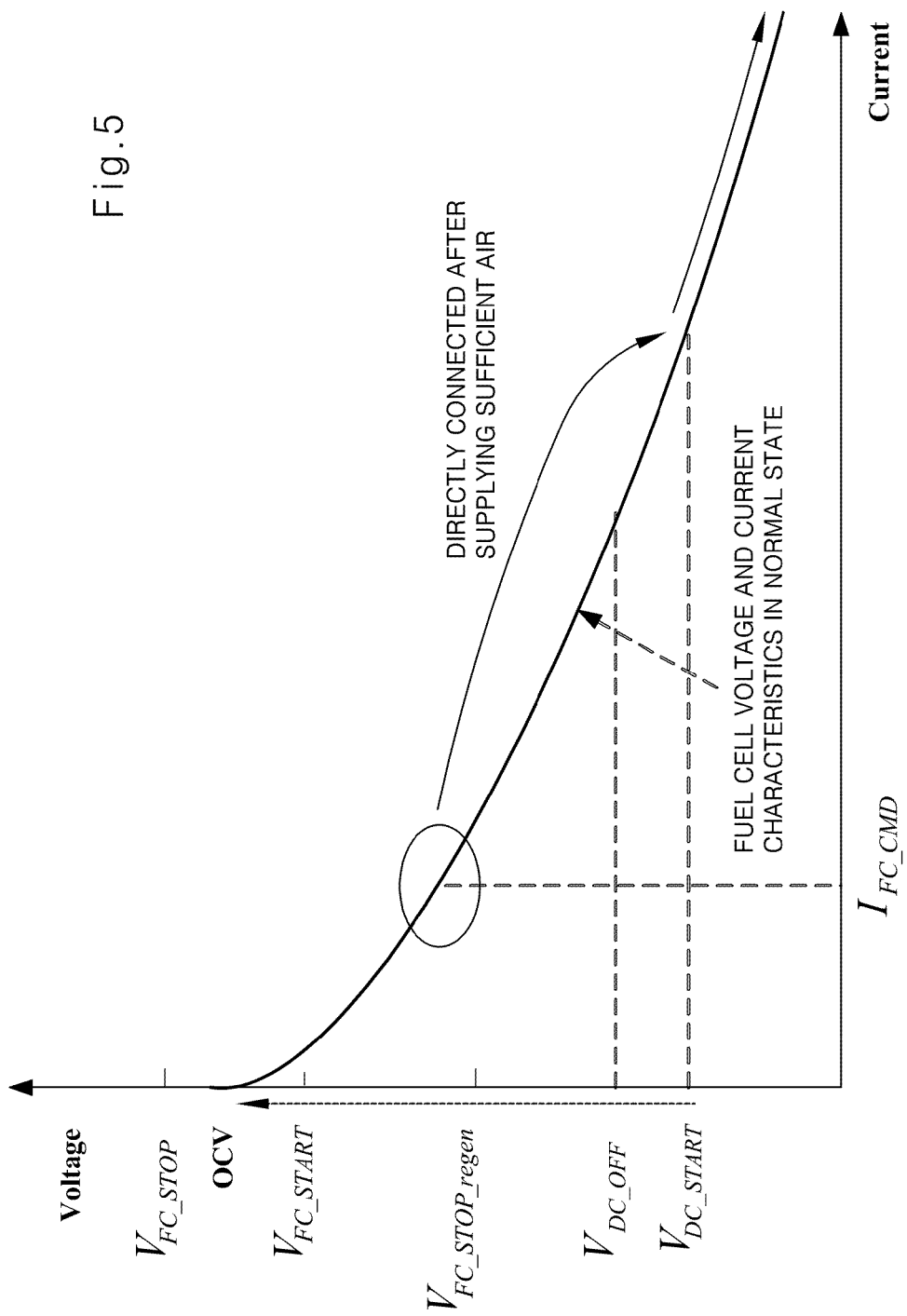
FIG. 5 is a diagram showing an operation region of the fuel cell in a mode switching process during vehicle acceleration in accordance with preferred embodiments of the present invention.
Figure 6:
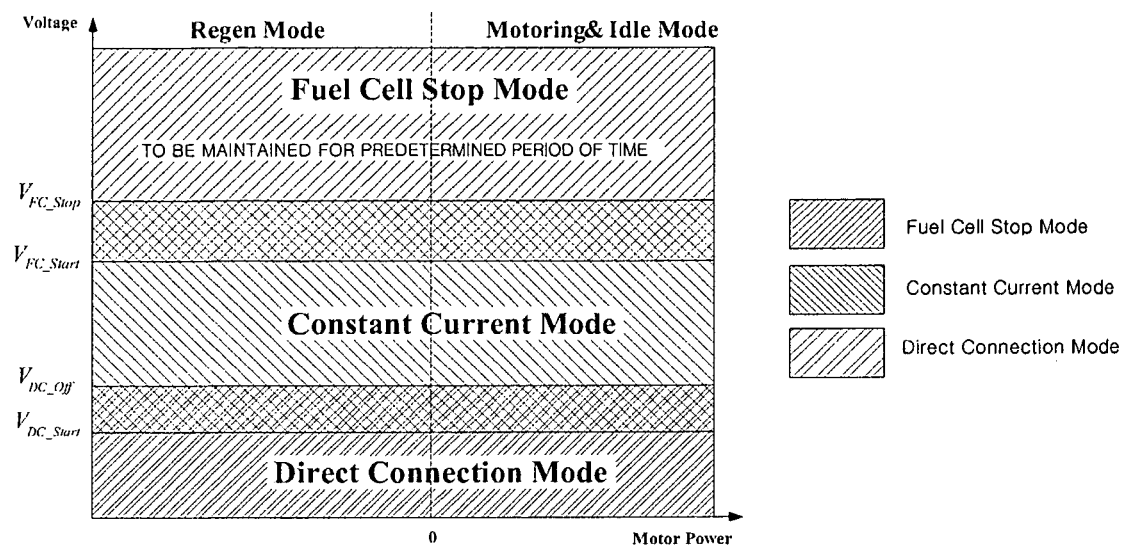
FIG. 6 is a diagram showing an example of an algorithm for determining an operation region of the fuel cell.

FIG. 4 is a flowchart showing an exemplary method for controlling output of a fuel cell in accordance with preferred embodiments of the present invention, in which a mode switching process of the fuel cell during vehicle acceleration is shown, FIG. 5 is a diagram showing an operation region of the fuel cell in the mode switching process during vehicle acceleration in accordance with preferred embodiments of the present invention, and FIG. 6 is a diagram showing an example of an algorithm for determining an operation region of the fuel cell according to preferred embodiments of the invention as described herein.

In FIGS. 4 to 6, $V_{SC}$ preferably represents a supercapacitor voltage (suitably corresponding to a main bus terminal voltage and the amount of electrical energy charged in the supercapacitor), $I_{FC\_CMD}$ preferably represents a fuel cell constant current value in the constant current mode, and $V_{FC\_STOP}$ preferably represents a reference voltage for stopping the power generation of the fuel cell. OCV preferably represents an open circuit voltage of the fuel cell, $V_{FC\_START}$ preferably represents a reference voltage for restarting the power generation of the fuel cell, $V_{FC\_STOP\_regen}$ preferably represents a reference voltage for stopping the power generation of the fuel cell during regenerative braking, $V_{DC\_OFF}$ preferably represents a reference voltage for releasing the fuel cell-supercapacitor direct connection, and $V_{DC\_START}$ preferably represents a reference voltage for starting the fuel cell-supercapacitor direct connection. $T_{Regen\_min\_off}$ preferably represents a minimum retention time of the fuel cell stop, and $T_{DC\_Delay}$ preferably represents a fuel cell-supercapacitor direct connection waiting time.

Next, the method for controlling the output of the fuel cell in accordance with preferred embodiments of the present invention will be described taking as an example a mode switching control, which is suitably performed in the fuel cell stop mode, the fuel cell constant current mode, and the fuel cell-supercapacitor direct connection mode, preferably according to the amount of vehicle load and the amount of electrical energy stored in the supercapacitor (corresponding to the main bus terminal voltage).

In one embodiments, in the fuel cell stop mode, the power distribution controller 123 cuts off the connection between the fuel cell 110 and the supercapacitor 131 by suitably turning off the directly connected switch 125, stops the operation of the buck-boost converter (power converter) 121 through the converter controller 122, and stops the operation of the fuel cell BOP components through the fuel cell system controller 111, thus nearly completely to completely stopping the power generation of the fuel cell (S11).

Then, in further embodiments, in a state where the power generation of the fuel cell is stopped, the power distribution controller 123 suitably compares the amount of electrical energy stored in the supercapacitor 131, i.e., a supercapacitor voltage $V_{SC}$ (preferably a main bus terminal voltage in the example of FIG. 2) measured by the voltage sensor 132 of the main bus terminal, with a suitably predetermined reference voltage $V_{FC\_START}$ for restarting the power generation of the fuel cell (S12). If the supercapacitor voltage $V_{SC}$ is reduced below the preferred reference voltage $V_{FC\_START}$ ($V_{FC} < V_{FC\_START}$) and if the elapsed time after the fuel cell stop (a stop mode retention time) exceeds a predetermined minimum retention time of the fuel cell stop $T_{Regen\_min\_off}$, the fuel cell constant current mode is suitably prepared. Here, the reason that the stop mode retention time is provided is to prevent the fuel cell from being frequently turned on (starting the power generation) and off (stopping the power generation).

In other preferred embodiments, for the constant current operation of the fuel cell, the fuel cell system controller 111 starts to operate the fuel cell BOP components such as, but not limited to, the air blower, the hydrogen recirculation blower, the water pump, etc. so as to perform a constant current control required for the constant current operation of the fuel cell (S13). The power distribution controller 123 operates the buck-boost converter 121 through the converter controller 122 in a state where the direct connected switch 125 is turned off, thus starting the constant current operation of the fuel cell (S14 and S15).

In further embodiments, the power distribution controller 123 prepares to enter the fuel cell-supercapacitor direct connection mode by determining that the supercapacitor voltage ($V_{SC}$) is reduced below a predetermined reference voltage $V_{DC\_START}$ for starting the fuel cell-supercapacitor direct connection.

According to other preferred embodiments, since excess current may flow if the fuel cell 110 and the supercapacitor 131 are preferably directly connected in a state where there is a voltage difference between the fuel cell 110 and the supercapacitor 131, air is suitably supercharged in advance to the fuel cell stack for a predetermined period of time, thus preparing the current flow (S16 and S17). Then, in further embodiments, if a supercharge retention time exceeds a predetermined waiting time $T_{DC\_Delay}$, the directly connected switch 125 is turned on to directly connect the fuel cell 110 and the supercapacitor 131, and the operation of the buck-boost converter 121 is stopped (S18 and S19). Preferably, during supercharging, the operation of the air blower is suitably controlled by the fuel cell system controller 111 so as to supercharge a predetermined amount of air.

In other further embodiments, the fuel cell system controller 111 controls the operation of the fuel cell BOP components such as, but not limited to, the air blower, the hydrogen recirculation blower, the water pump, etc. in accordance with the amount of load required by the vehicle (a load following operation) in a state where the operation of the buck-boost converter 121 is stopped and the direct connected switch 125 is turned on (S20), thus entering the fuel cell-supercapacitor direct connection mode.

Thus, according to embodiments of the invention as described herein, the present invention performs the 3-step control modes, preferably including the fuel cell stop mode, the fuel cell constant current mode, and the fuel cell-supercapacitor direct connection mode according to the level of energy stored in the storage means (supercapacitor), thus effectively operating the fuel cell hybrid system through the 3-step control modes of the fuel cell output.

According to preferred embodiments of the invention, the fuel cell 110 is preferably operated in the constant current mode at a maximum efficiency point using the power converter (buck-boost converter) 121, the fuel cell 110 and the storage means 131 are directly connected by turning off the power converter 121 and turning on the directly connected switch 125 if the output and energy of the storage means are insufficient as the voltage of the storage means 131 is suitably reduced below a predetermined level or as the output required by the vehicle is above a suitably predetermined level, and the power generation of the fuel cell is stopped if the voltage of the storage means 131 is suitably increased above a predetermined level during stopping or during low power operation, preferably such that the fuel cell is operated at the maximum efficiency point, and in further embodiments, thus improving the fuel efficiency of the fuel cell and the efficiency of the fuel cell system.

As described in the present invention, the fuel cell and the storage means are preferably directly connected, if necessary, to suitably perform the load following operation, in which the output of the fuel cell is controlled to follow the load required by the vehicle, and the constant current operation, in which the fuel cell is preferably operated at a maximum efficiency point, is performed during a selected period to increase the efficiency of the fuel cell during high power operation, thus improving the fuel efficiency and the efficiency of the fuel cell system. In further preferred embodiments, it is possible to suitably maximize the improvement in fuel efficiency by stopping, or preferably completely stopping, the power generation of the fuel cell when the output of the fuel cell is not necessary. In further embodiments, it is possible to improve the durability of the fuel cell by suitably reducing the OCV, and the current limit control of the fuel cell is facilitated in the event of an emergency, thus providing an advantageous effect in terms of the protection of the fuel cell.

Figure 7:
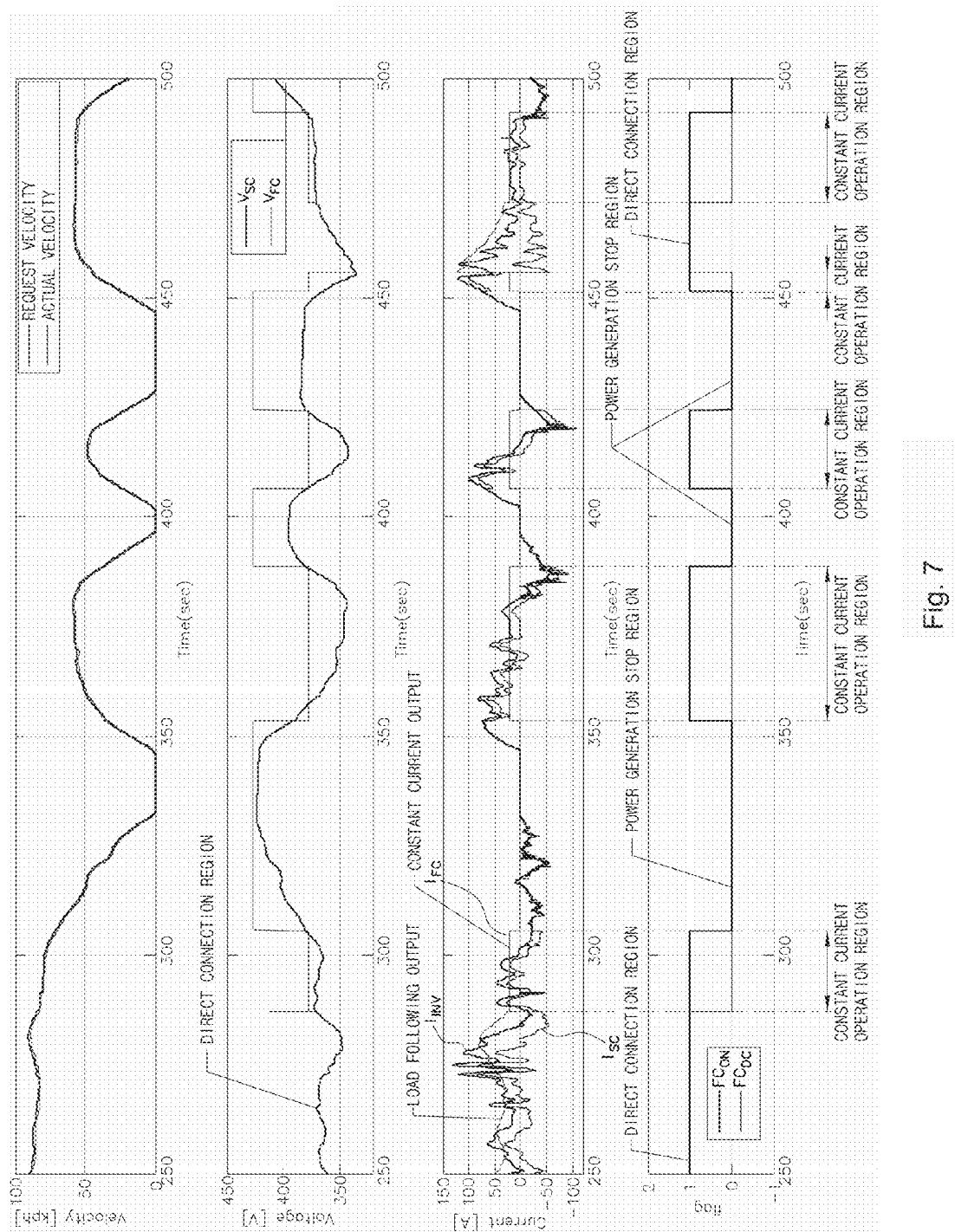
FIG. 7 is a diagram showing results obtained by applying the present invention to a vehicle.

In one exemplary embodiment, the present inventor performed a driving test using the Urban Dynamometer Driving Schedule (UDDS) by suitably applying the present invention directly to an actual vehicle, and the results are shown in FIG. 7. As shown in the figure, the fuel cell was preferably operated in three modes including the fuel cell stop mode, the fuel cell constant current mode, and the load following operation mode after the direct connection, although it is understaood that the invention is not limited only to these modes described herein. Accordingly, when the supercapacitor voltage $V_{SC}$ was increased above a suitable predetermined reference voltage $V_{DC\_OFF}$ ($V_{SC} > V_{DC\_OFF}$) in the direct connection mode ($FC_{ON}=1$, $FC_{DC}=1$) in which the load following operation was preferably performed, the fuel cell entered the fuel cell stop mode in which the fuel cell was turned off and, when the supercapacitor voltage $V_{SC}$ was suitably reduced below the predetermined reference voltage $V_{FC\_START}$ ($V_{SC} < V_{FC\_START}$) in the fuel cell stop mode, the fuel cell was turned on and preferably operated in the constant current mode ($FC_{ON}=1$, $FC_{DC}=0$).

In further preferred embodiments, when the supercapacitor voltage $V_{SC}$ was reduced below the preferred predetermined reference voltage $V_{DC\_START}$ ($V_{SC} < V_{DC\_START}$) during repetition of the constant current mode and the fuel cell stop mode, the directly connected switch was turned on and the fuel cell reentered the direct connection mode ($FC_{ON}=1$, $FC_{DC}=1$) in which the load following operation was performed.

Preferably, in the fuel cell stop mode, the fuel cell voltage $V_{FC}$ was maintained at OCV as the operation of the BOP components was stopped (at this time, the fuel cell current $I_{FC}=0$) and, in the constant current mode, the constant current output of the fuel cell was achieved by controlling the buck-boost converter.

In FIG. 7, "$FC_{ON}=1$" represents a suitable fuel cell power generation state (on state), "$FC_{ON}=0$" represents a fuel cell stop state (off state), "$FC_{DC}=1$" represents a suitable fuel cell-supercapacitor direct connection state, and "$FC_{DC}=0$" represents a state where the fuel cell-supercapacitor direct connection is released. $I_{INV}$, $I_{FC}$, and $I_{SC}$ represent a suitable inverter current, a fuel cell current, and a supercapacitor current, respectively.

Figure 8:
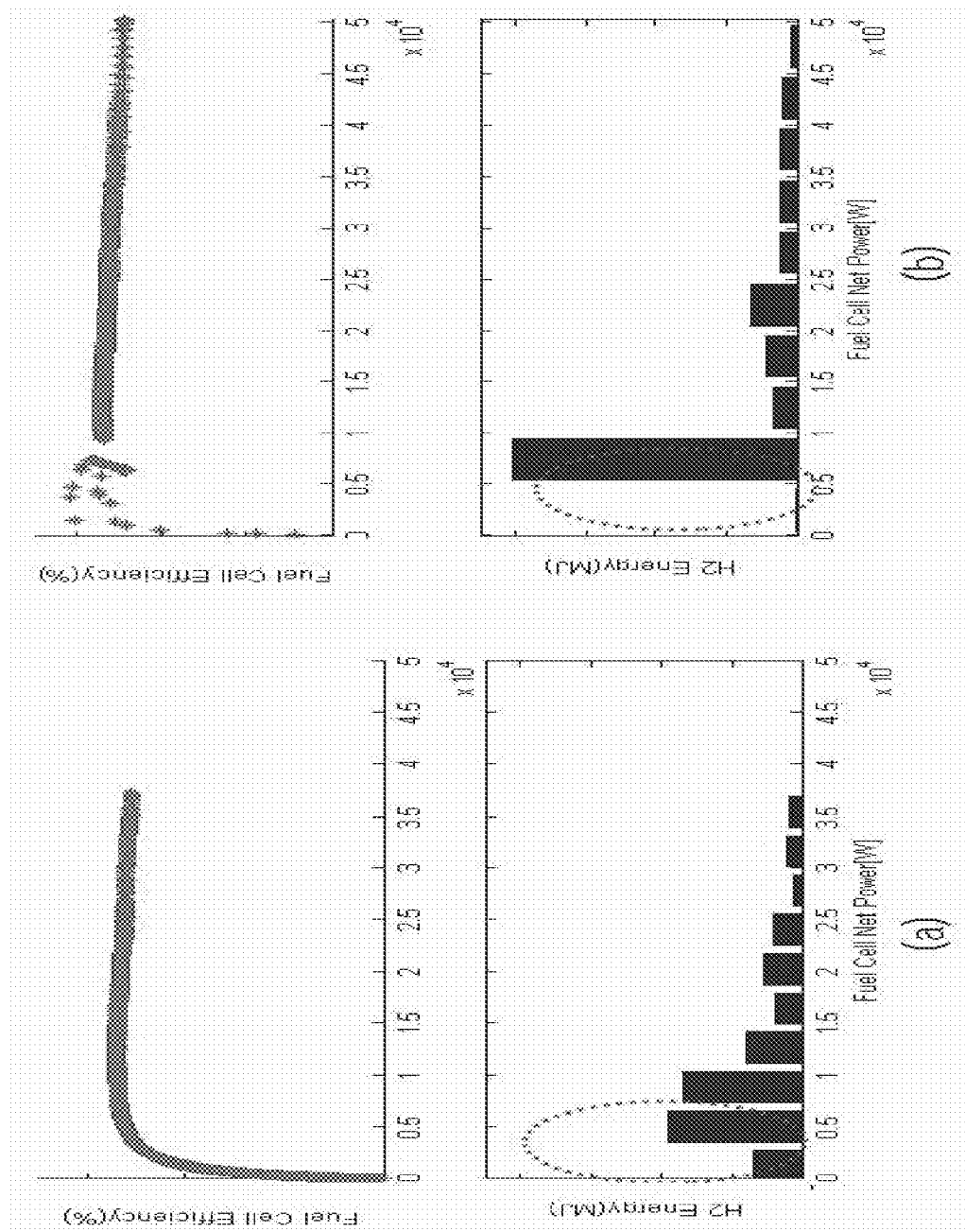
FIGS. 8 and 9 are analysis results showing that the efficiency of a fuel cell system is improved and energy use distribution is improved when the present invention is applied.
Figure 9:
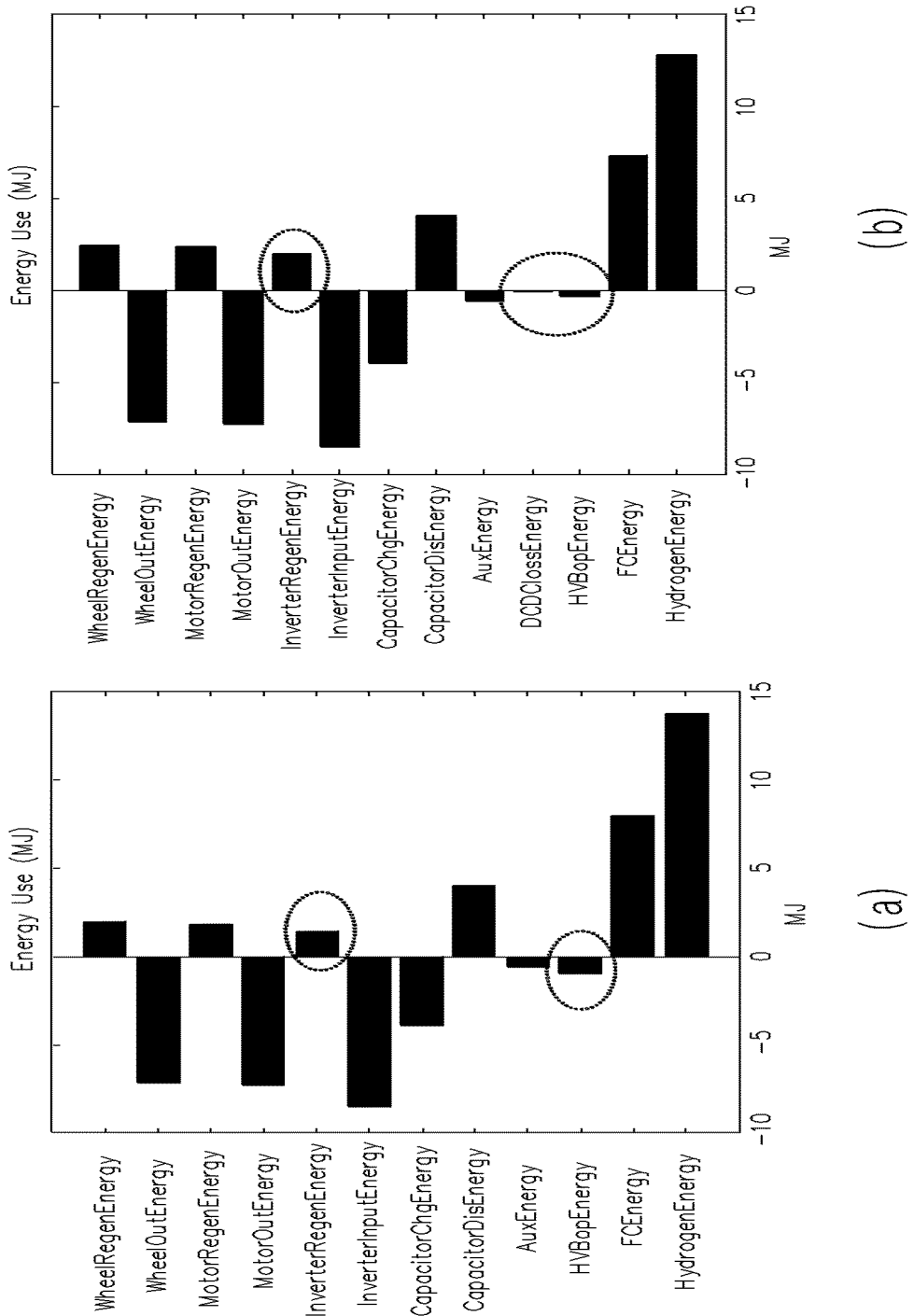

FIGS. 8 and 9 are analysis results showing that the efficiency of a fuel cell system is suitably improved and energy use distribution is suitably improved when the present invention is applied, in which (a) shows a state before the improvement and (b) shows a state after the improvement. In the figures, the energy use distribution during the UDDS cycle is shown. Referring to the figures, it can be seen that the fuel cell operation points are concentrated at the maximum efficiency point (refer to dotted lines in FIG. 8). Moreover, since the fuel cell BOP components can be operated in accordance with the fuel cell operation in the constant current mode, the efficiency of the fuel cell system can be further improved. In preferred embodiments, it can been seen that the above-described effects of the present invention are remarkable if the average output required by the vehicle is in the vicinity of the maximum efficiency point of the fuel cell in the driving mode like the UDDS mode.

According to the present invention, for example a 5, 6, 7, 8, 9, or more, preferably a nearly 7% improvement in fuel efficiency was obtained regardless of an energy loss by the power converter (DCDClossEnergy), and such an improvement in fuel efficiency suitably results from a reduction in energy consumption by the fuel cell BOP components (HVBoPEnergy) (refer to dotted lines in FIG. 9). In FIG. 9, "Fuel Cell Net Power" represents an exemplary output obtained by subtracting an output, required in the fuel cell BOP components, from an output of the fuel cell, and denotes an output applied from the fuel cell to the vehicle load according to certain embodiments of the invention as described herein.

In further embodiments, the present invention provides a method for controlling output of a fuel cell in a fuel cell hybrid vehicle, which can maximize the amount of energy recovery during regenerative braking and thus improve fuel efficiency.

According to the present invention, the power generation of the fuel cell is preferably stopped according to the level of energy of the storage means, which is the auxiliary power source, (hereinafter, the main bus terminal voltage and the supercapacitor voltage corresponding to the amount of electrical energy of the storage means), in which the conditions for the fuel cell stop are suitably differentiated according to whether the regenerative braking is performed such that, if it is determined that the regenerative braking is suitably performed, the power generation of the fuel cell is stopped in advance to recover sufficient regenerative braking energy, even, in certain embodiments, if the level of energy of the storage means is low, thus suitably maximizing the amount of regenerative braking and improving the fuel efficiency.

Figure 10:
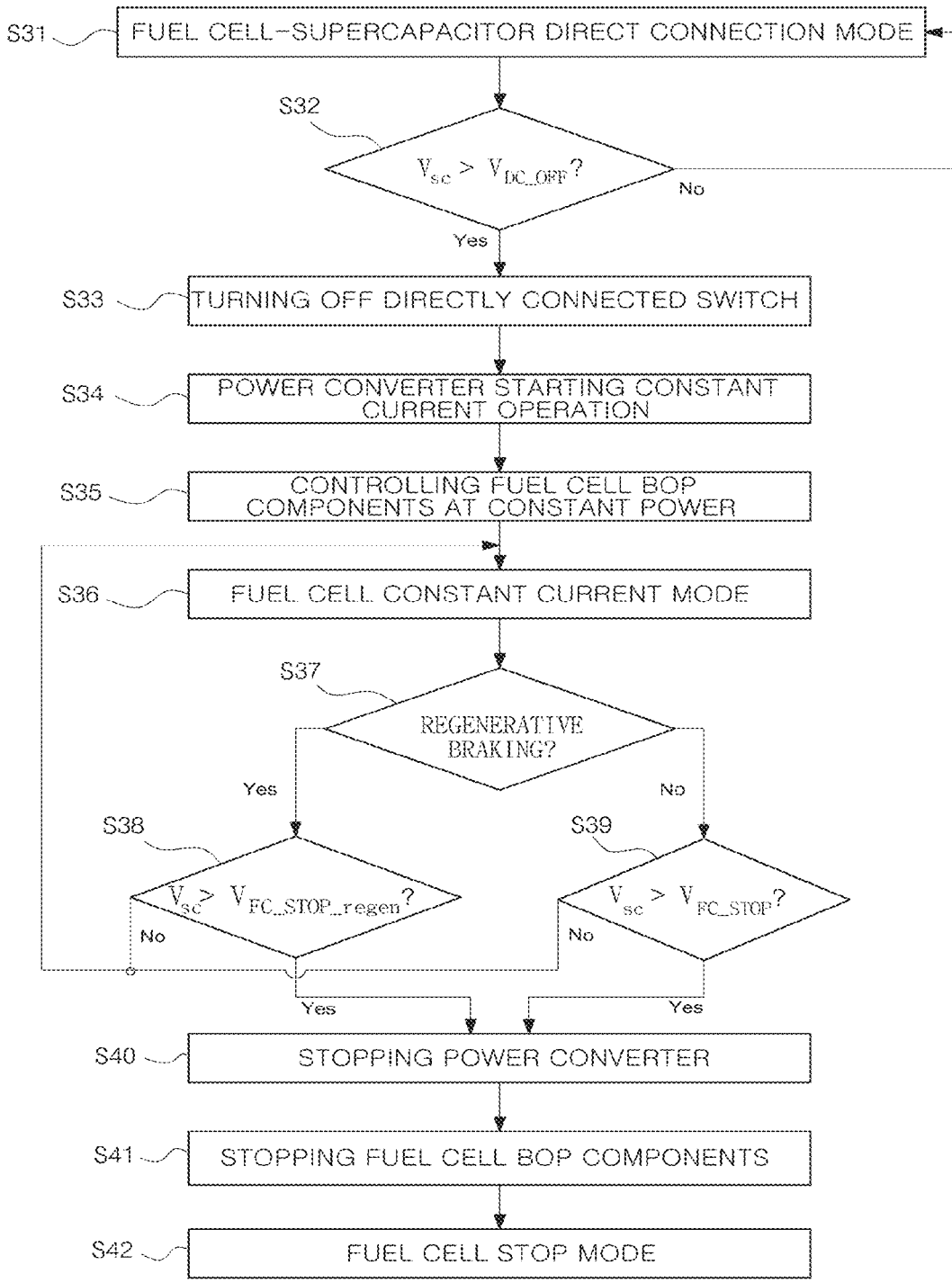
FIG. 10 is a flowchart showing a method for controlling output of a fuel cell in accordance with another preferred embodiment of the present invention, in which a mode switching process of the fuel cell during vehicle deceleration is shown.
Figure 11:
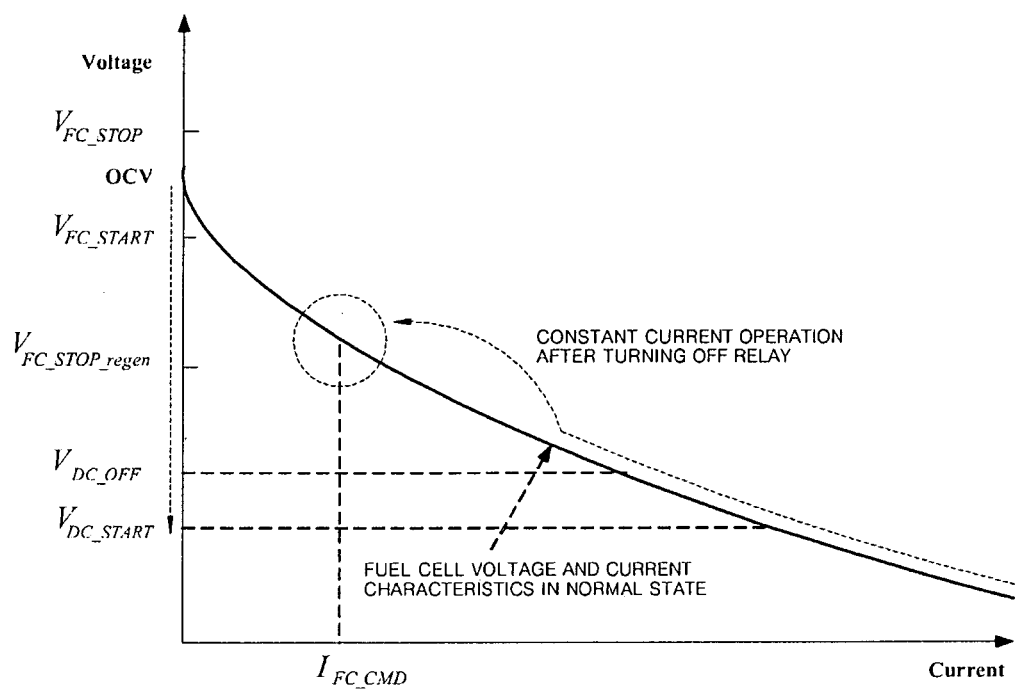
FIG. 11 is a diagram showing an operation region of the fuel cell in a mode switching process during vehicle deceleration in accordance with the present invention.
Figure 12:
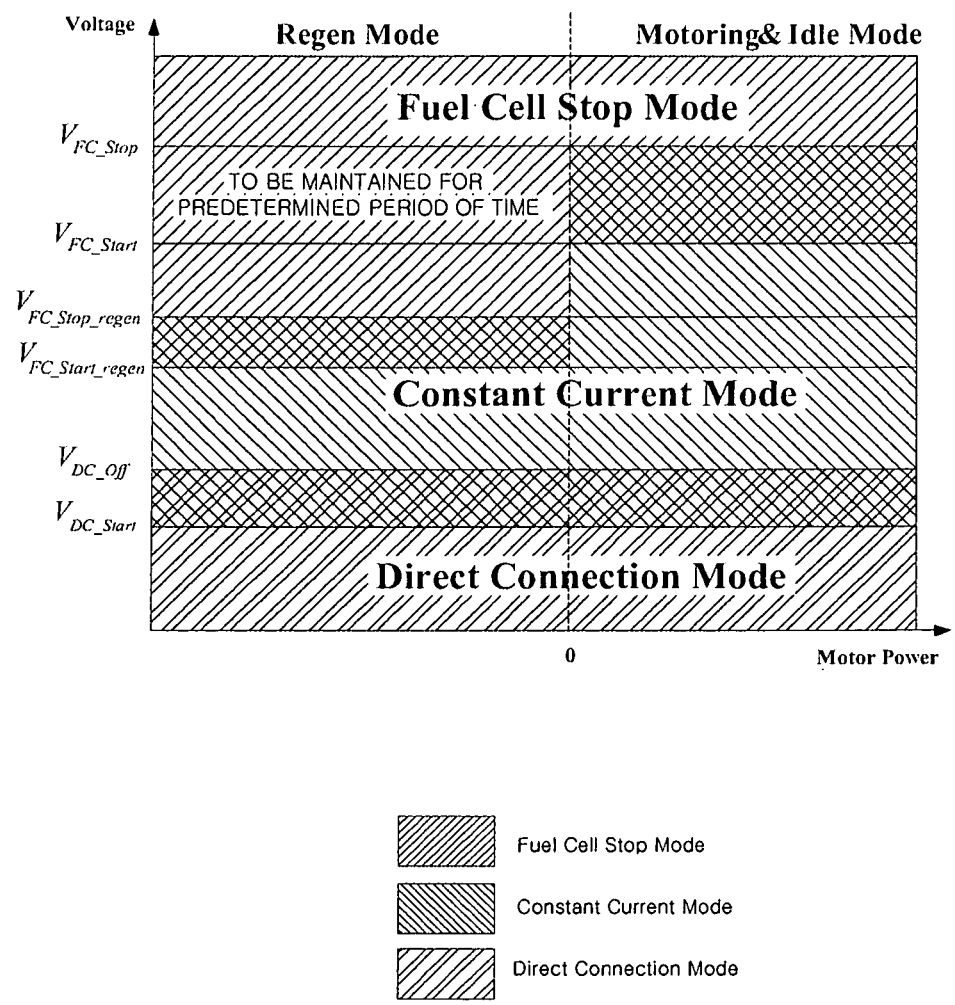
FIG. 12 is a diagram showing another example of an algorithm for determining an operation region of the fuel cell.

FIG. 10 is a flowchart showing an exemplary method for controlling output of a fuel cell in accordance with another preferred embodiment of the present invention, in which a mode switching process of the fuel cell during vehicle deceleration is shown, FIG. 11 is a diagram showing an operation region of the fuel cell in a mode switching process during vehicle deceleration in accordance with preferred embodiments of the present invention, and FIG. 12 is a diagram showing another example of an algorithm for determining an operation region of the fuel cell. As described herein, the present invention, in preferred embodiments, aims at maximizing the amount of energy recovery during regenerative braking, the features of the regenerative braking in accordance with the present invention will be described taking an example of a mode switching control, which is performed in a direct connection mode during vehicle deceleration, a fuel cell constant current mode, and a fuel cell stop mode.

In FIGS. 10 to 12, $V_{SC}$ represents a supercapacitor voltage (corresponding to a main bus terminal voltage and the amount of electrical energy charged in the supercapacitor), $I_{FC\_CMD}$ represents a suitable fuel cell constant current value in the constant current mode, and $V_{FC\_STOP}$ represents a suitable reference voltage for stopping the power generation of the fuel cell. OCV represents a suitable open circuit voltage of the fuel cell, $V_{FC\_START}$ represents a suitable reference voltage for restarting the power generation of the fuel cell, $V_{FC\_STOP\_regen}$ represents a suitable reference voltage for stopping the power generation of the fuel cell during regenerative braking, $V_{DC\_OFF}$ represents a suitable reference voltage for releasing the fuel cell and the supercapacitor direct connection, and $V_{DC\_START}$ represents a suitable reference voltage for starting the fuel cell-supercapacitor direct connection.

According to preferred embodiments of the invention as described herein, the fuel cell-supercapacitor direct connection mode (S31) is a hybrid mode, in which the vehicle is driven by the power of the fuel cell 110 and the supercapacitor 131 at the same time and a drive motor 142 is operated by electrical energy of the fuel cell 110 and the supercapacitor 131. Preferably, the fuel cell 110 and the supercapacitor 131 are directly connected in a state where the directly connected switch 125 is preferably turned on, and the load following operation in which the operation of the fuel cell BOP components such as, but not only limited to, the air blower, the hydrogen recirculation blower, the water pump, etc. is controlled in preferred accordance with the amount of load required by the vehicle is suitably performed.

Referring to FIG. 10, while the vehicle is preferably driven in the fuel cell-supercapacitor direct connection mode, if the amount of electrical energy charged in the supercapacitor 131 during vehicle deceleration is suitably above a predetermined level (S32), i.e., if the supercapacitor voltage $V_{SC}$ (corresponding to the main bus terminal voltage) is above a predetermined level $V_{DC\_OFF}$ ($V_{SC}>V_{DC\_OFF}$), the direct connection mode is released and the fuel cell constant current mode is prepared. Accordingly, the power distribution controller 123 preferably turns off the directly connected switch 125 (S33) to release the direct connection between the fuel cell 110 and the supercapacitor 131, and the buck-boost converter 121 (power converter) is operated under the control of the converter controller 122 to start the fuel cell constant current mode (S34). According to further preferred embodiments, the fuel cell system controller 111 performs a constant current control required for the constant current operation of the fuel cell for the fuel cell BOP components (S35).

According to further embodiments, if the supercapacitor voltage (corresponding to the main bus terminal voltage) is increased above a predetermined level during the fuel cell constant current mode (S36), the fuel cell stop mode is preferably performed. Accordingly, the power distribution controller 123 which suitably receives a braking signal determines whether the regenerative braking is performed (S37) and, if it is not the regenerative braking, it is determined whether the supercapacitor voltage $V_{SC}$ is higher than a reference voltage $V_{FC\_STOP}$ for stopping the power generation of the fuel cell ($V_{SC}>V_{FC\_STOP}$). Accordingly, in further embodiments, a control for entering the fuel cell stop mode is suitably performed. Preferably, the converter controller 122 suitably stops the buck-boost converter 121 (S40), and the fuel cell system controller 111 suitably stops the operation of the fuel cell BOP components, thus stopping the power generation of the fuel cell (S41 and S42).

In other embodiments, if the power distribution controller 123 has suitably determined that the regenerative braking is performed, the power generation of the fuel cell is stopped in advance to recover sufficient regenerative braking energy, even if the supercapacitor voltage $V_{SC}$ is lower than the reference voltage $V_{FC\_STOP}$ for stopping the power generation of the fuel cell. Preferably, in certain embodiments, the supercapacitor voltage $V_{SC}$ is compared with a suitable reference voltage $V_{FC\_STOP\_regen}$ for stopping the power generation of the fuel cell during regenerative braking, which is set to be suitably lower than the reference voltage $V_{FC\_STOP}$ (S38) and, if the supercapacitor voltage $V_{SC}$ is suitably higher than the reference voltage $V_{FC\_STOP\_regen}$ for stopping the power generation of the fuel cell during regenerative braking, the control for entering the fuel cell stop mode is immediately performed (S40 to S42).

According to embodiments of the invention as described herein, in the fuel cell hybrid vehicle in which the 3-step control modes including the fuel cell stop mode, the fuel cell constant current mode, and the fuel cell-supercapacitor direct connection mode are preferably performed, it is determined whether the regenerative braking is performed in the above manner, and a criterion for stopping the power generation of the fuel cell is changed according to the determination results such that the power generation of the fuel cell is stopped according to the changed criterion. In preferred embodiments, during regenerative braking, the fuel cell stop mode is performed in advance by applying a relatively low criterion even if the supercapacitor voltage (corresponding to the voltage of the auxiliary power source) is low, thus suitably increasing the amount of regenerative braking.

Accordingly, the criterion for stopping the power generation of the fuel cell is suitably changed so as to suitably prevent limitations in the energy recovery. According to preferred embodiments, in the fuel cell hybrid vehicle, the lower the supercapacitor voltage during regenerative braking is, the more the amount of regenerative braking is suitably increased and, if the voltage increase by the automatic charge from the fuel cell to the supercapacitor is prevented, the amount of regenerative braking is increased. As a result, in embodiments of the present invention, the criterion value for stopping the power generation of the fuel cell differentiated according to whether the regenerative braking is performed is applied such that the power generation of the fuel cell is stopped in advance at lower supercapacitor voltages during regenerative braking, thus suitably maximizing the amount of regenerative braking and improving the fuel efficiency. Moreover, according to further embodiments, it is possible to protect the high voltage parts by preventing the voltage of the main bus terminal from rising.

Referring to FIG. 12, in preferred embodiments, the operation mode is preferably selected according to the level of energy of the supercapacitor (preferably corresponding to the main bus terminal voltage); however, the conditions for entering the fuel cell stop mode are suitably differentiated according to whether the regenerative braking is performed, thus increasing the stop region of the fuel cell power generation. According to further embodiments, since the power generation of the fuel cell is stopped, for example preferably suddenly stopped, during regenerative braking, it is possible to prevent the supercapacitor from being automatically charged by the fuel cell, thus ensuring suitably sufficient energy buffer region capable of performing the regenerative braking.

Figure 13:
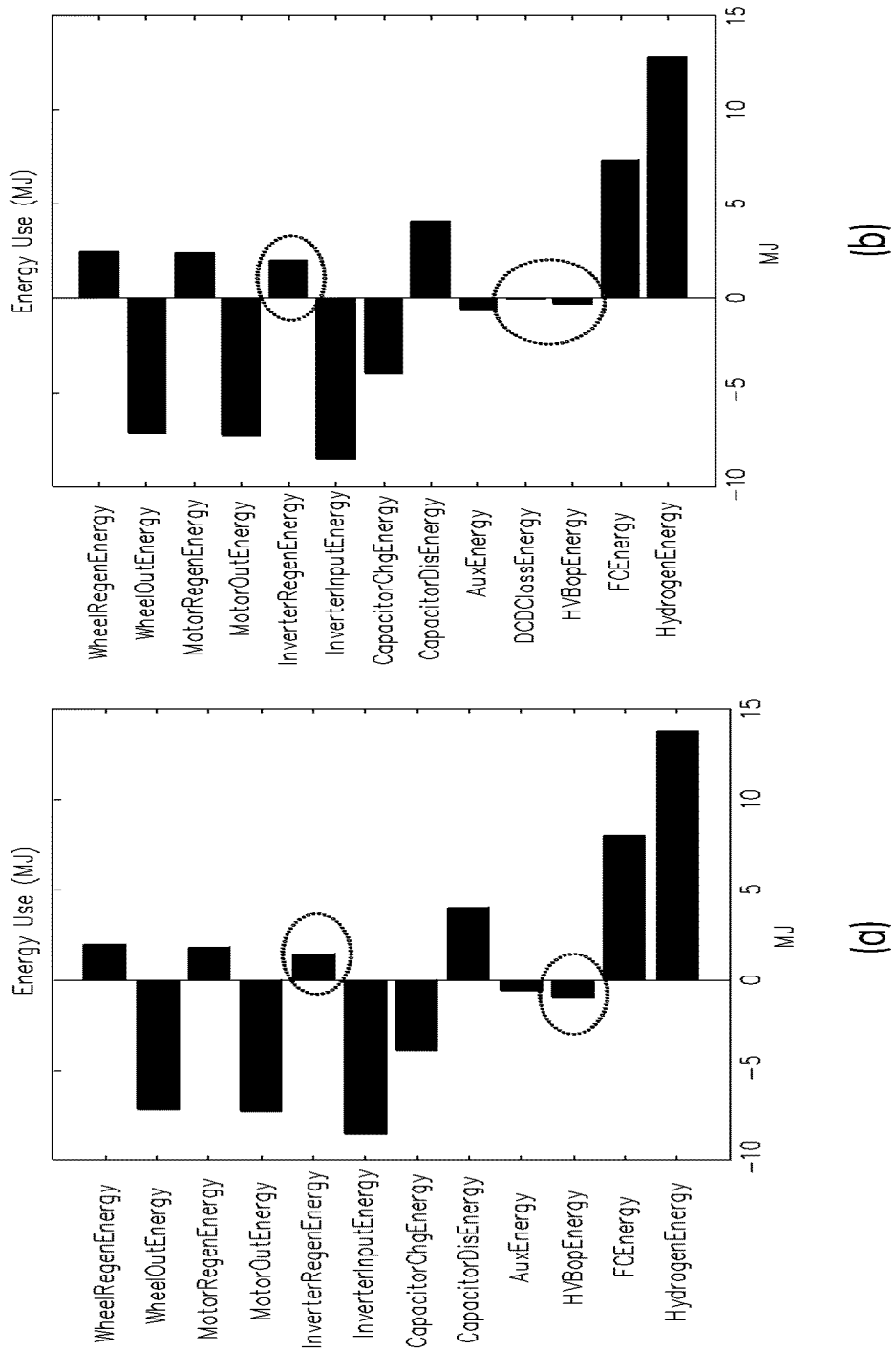
FIG. 13 is analysis results showing that fuel efficiency is improved when the present invention is applied, compared with a conventional fuel cell-supercapacitor system.

FIG. 13 is analysis results showing that the fuel efficiency is suitably improved when the present invention is applied, compared with the conventional fuel cell-supercapacitor system. It can be seen that, according to preferred embodiments of the invention as described herein, the fuel efficiency is improved due to a reduction in the energy consumed by the fuel cell BOP components (HVBoPEnergy) and an increased in the amount of regenerative braking, even though there is an energy loss by the power converter (DCDClossEnergy).

As described above, in the preferred method for controlling the output of the fuel cell in accordance with the preferred embodiments of the present invention, the fuel cell is suitably operated at a constant power at a suitable maximum efficiency point, the fuel cell and the storage means are preferably directly connected if the output and energy of the storage means are suitably insufficient, and the power generation of the fuel cell is stopped if the level of energy of the storage means is increased during stopping or during low power operation such that the fuel cell is intensively operated at the maximum efficiency point, thus suitably improving the fuel efficiency of the fuel cell and the efficiency of the fuel cell system.

In further embodiments, the fuel cell and the storage means are preferably directly connected, if necessary, to perform a load following operation, in which the output of the fuel cell is suitably controlled to follow the load required by the vehicle, and the constant current operation, in which the fuel cell is preferably operated at a maximum efficiency point, is performed during a selected period to improve the efficiency of the fuel cell during high power operation, thus suitably improving the fuel efficiency and the efficiency of the fuel cell system.

It is possible in further embodiments, therefore, to maximize the improvement in fuel efficiency by stopping, for example completely stopping, the power generation of the fuel cell when the output of the fuel cell is not necessary.

In other certain embodiments, it is possible to improve the durability of the fuel cell by preferably reducing the OCV, and the current limit control of the fuel cell is suitably facilitated in the event of an emergency, thus, for example, providing an advantageous effect in terms of the protection of the fuel cell.

In further embodiments, according to the preferred method for controlling the output of the fuel cell in the fuel cell hybrid vehicle in which the control modes, preferably the 3-step control modes, preferably including the fuel cell stop mode, the fuel cell constant current mode, and the fuel cell-supercapacitor direct connection mode are performed in accordance with another preferred embodiment of the present invention, it is suitably determined whether the regenerative braking is performed, and the criterion for stopping the power generation of the fuel cell is changed according to the determination results such that the fuel cell stop mode is performed according to the changed criterion; however, during regenerative braking, the fuel cell stop mode is performed in advance by applying a relatively low criterion even if the voltage of the storage means is low, thus increasing the amount of regenerative braking.

Accordingly, it is possible to increase the amount of regenerative braking by preferably stopping the power generation of the fuel cell in advance in a state where the supercapacitor voltage is suitably lower than that during regenerative braking by applying the criterion for the fuel cell stop mode distinguished according to whether the regenerative braking is performed, thus suitably increasing the amount of regenerative amount and the fuel efficiency. Moreover, in further embodiments of the invention as described herein, it is possible to protect the high voltage parts by preferably preventing the voltage of the main bus terminal from rising. It is possible, in certain preferred embodiments of the invention as described, to prevent the supercapacitor from being automatically charged by the fuel cell by stopping, for example preferably suddenly stopping, the power generation of the fuel cell during regenerative braking, thus suitably maximizing the amount of regenerative braking.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling output of a fuel cell in a fuel cell hybrid vehicle including a fuel cell as a main power source and a storage means as an auxiliary power source, the vehicle having a power converter disposed between the fuel cell and the storage means and provided for a constant current operation of the fuel cell and a directly connected switch for directly connecting/disconnecting the fuel cell and the storage means, the method comprising:

controlling an output of the fuel cell according to an amount of electrical energy already stored in the storage means by switching between a fuel cell stop mode, a fuel cell constant current mode and a fuel cell storage means direct connection mode wherein power generation of the fuel cell is stopped in the fuel cell stop mode, the power converter is operated so that the fuel cell is operated at a constant power at a maximum efficiency point in the fuel cell constant current mode, and the fuel cell and the storage means are directly connected by the directly connected switch and then the output of the fuel cell is controlled according to a load required by the vehicle in the fuel cell-storage means direct connection mode, wherein, if the amount of electrical energy of the storage means is below a reference value for restarting the power generation of the fuel cell and if the elapsed time after the fuel cell stop exceeds a predetermined minimum retention time in the fuel cell stop mode, the fuel cell stop mode is switched to the fuel cell constant current mode in a state where the directly connected switch is turned off.

2. The method of claim 1, wherein, in the fuel cell constant current mode, fuel cell balance-of-plant components are controlled to be operated at a constant power in a state where the power converter is controlled to apply a voltage corresponding to the maximum efficiency point to an output side of the fuel cell such that the fuel cell is operated at a constant power in which an output current of the fuel cell is maintained at a constant level.

3. The method of claim 2, wherein the power converter is a buck-boost converter, and a converter controller controls the operation of the buck-boost converter to apply a voltage corresponding to the maximum efficiency point by sensing a voltage of an output terminal of the buck-boost converter through a voltage sensor.

4. The method of claim 1, wherein, if the amount of electrical energy of the storage means is below a reference value for starting the fuel cell-storage means direct connection mode in the fuel cell constant current mode, the fuel cell and the storage means are directly connected by the directly connected switch and the operation of the power converter is stopped such that the fuel cell constant current mode is switched to the fuel cell-storage means direct connection mode.

5. The method of claim 4, wherein air is supercharged to a fuel cell stack for a predetermined period of time before the fuel cell and the storage means are directly connected by the directly connected switch.

6. The method of claim 1, wherein the amount of electrical energy of the storage means is a storage means voltage measured by a voltage sensor of a main bus terminal.

7. The method of claim 1, further comprising:
determining whether regenerative braking is performed;
determining whether to enter the fuel cell stop mode by comparing the amount of electrical energy of the storage means with reference values predetermined according to whether the regenerative braking is performed; and
stopping the power generation of the fuel cell if the amount of electrical energy of the storage means is greater than the corresponding reference value.

8. The method of claim 7, wherein the reference value during regenerative braking is set to be lower than the reference value in the case where the regenerative braking is not performed so that the fuel cell stop mode is performed in a state where the amount of electrical energy of the storage means is lower than that in the case where the regenerative braking is not performed.

9. The method of claim 7, further comprising:
switching the fuel cell-storage means direct connection mode to the fuel cell constant current mode, if the amount of electrical energy of the storage means is above a predetermined level in the fuel cell-storage means direct connection mode in a state where the directly connected switch is turned on;
determining whether the regenerative braking is performed in the fuel cell constant current mode;
determining whether to enter the fuel cell stop mode; and
stopping the power generation of the fuel cell.

10. A method for controlling output of a fuel cell in a fuel cell hybrid vehicle including a fuel cell as a main power source and a storage means as an auxiliary power source, the method comprising:
controlling an output of the fuel cell according to an amount of electrical energy within the storage means by switching a mode of the fuel cell between a fuel cell stop mode, a fuel cell constant current mode and a fuel cell storage means direct connection mode to control the output of the fuel cell to the storage means,
wherein, if the amount of electrical energy of the storage means is below a reference value for restarting the power generation of the fuel cell and if the elapsed time after the fuel cell stop exceeds a predetermined minimum retention time in the fuel cell stop mode, the fuel cell stop mode is switched to the fuel cell constant current mode in a state where the directly connected switch is turned off.

11. The method of claim 10, wherein the vehicle comprises a power converter disposed between the fuel cell and the storage means and provides for a constant current operation of the fuel cell and a directly connected switch for directly connecting/disconnecting between the fuel cell and the storage means.

12. The method of claim 10, wherein in the fuel cell stop mode power generation of the fuel cell is stopped.

13. The method of claim 10, wherein in the constant current mode the power converter is operated so that the fuel cell is operated at a constant power at a maximum efficiency point.

14. The method of claim 10, wherein in the fuel cell-storage means direct connection mode the fuel cell and the storage means are directly connected by a directly connected switch.

15. The method of claim 10, wherein the output of the fuel cell is further controlled according to a load required by the vehicle.

* * * * *